United States Patent
Kluessendorf et al.

[19]

[11] Patent Number: 6,073,718
[45] Date of Patent: Jun. 13, 2000

[54] MOTORCYCLE MASTER CYLINDER COVER

[75] Inventors: Timothy J. Kluessendorf, Racine; Clifford J. Landon, Port Washington, both of Wis.; Wyatt Fuller, Hickory, N.C.

[73] Assignee: Harley-Davidson Motor Company, Milwaukee, Wis.

[21] Appl. No.: 09/186,312

[22] Filed: Nov. 4, 1998

[51] Int. Cl.⁷ .................................................. B62D 63/08
[52] U.S. Cl. .............................. 180/218; 74/512; 74/608
[58] Field of Search .................................. 180/219, 69.1, 180/346; D12/126; 280/287, 770; 74/608, 609, 512; 60/33, 547.1; 123/195 C, 198 E; 150/157

[56] References Cited

U.S. PATENT DOCUMENTS

D. 294,580   3/1988  Segal ........................................... D15/5
D. 294,685   3/1988  Opitz ......................................... D12/126
D. 350,315   9/1994  Rudd et al. ............................... D12/126
D. 409,119   5/1999  Fervoy ...................................... D12/126

*Primary Examiner*—Anne Marie Boehler
*Assistant Examiner*—Tony Winner
*Attorney, Agent, or Firm*—Michael Best & Friedrich LLP

[57] ABSTRACT

A cover for a master cylinder assembly and a portion of a brake pedal of a motorcycle includes first and second cover members. The first cover member covers an outer end of the brake pedal hub, and covers the master cylinder assembly. The brake pedal is movable with respect to the first cover member. The second cover member is fixed to an inner end of the brake hub for rotation with the brake pedal hub. The second cover member is at least partially disposed within the first cover member. A slot is defined between the first and second cover members through which a lever portion of the brake pedal extends. The slot allows full range of motion for the brake pedal.

20 Claims, 3 Drawing Sheets

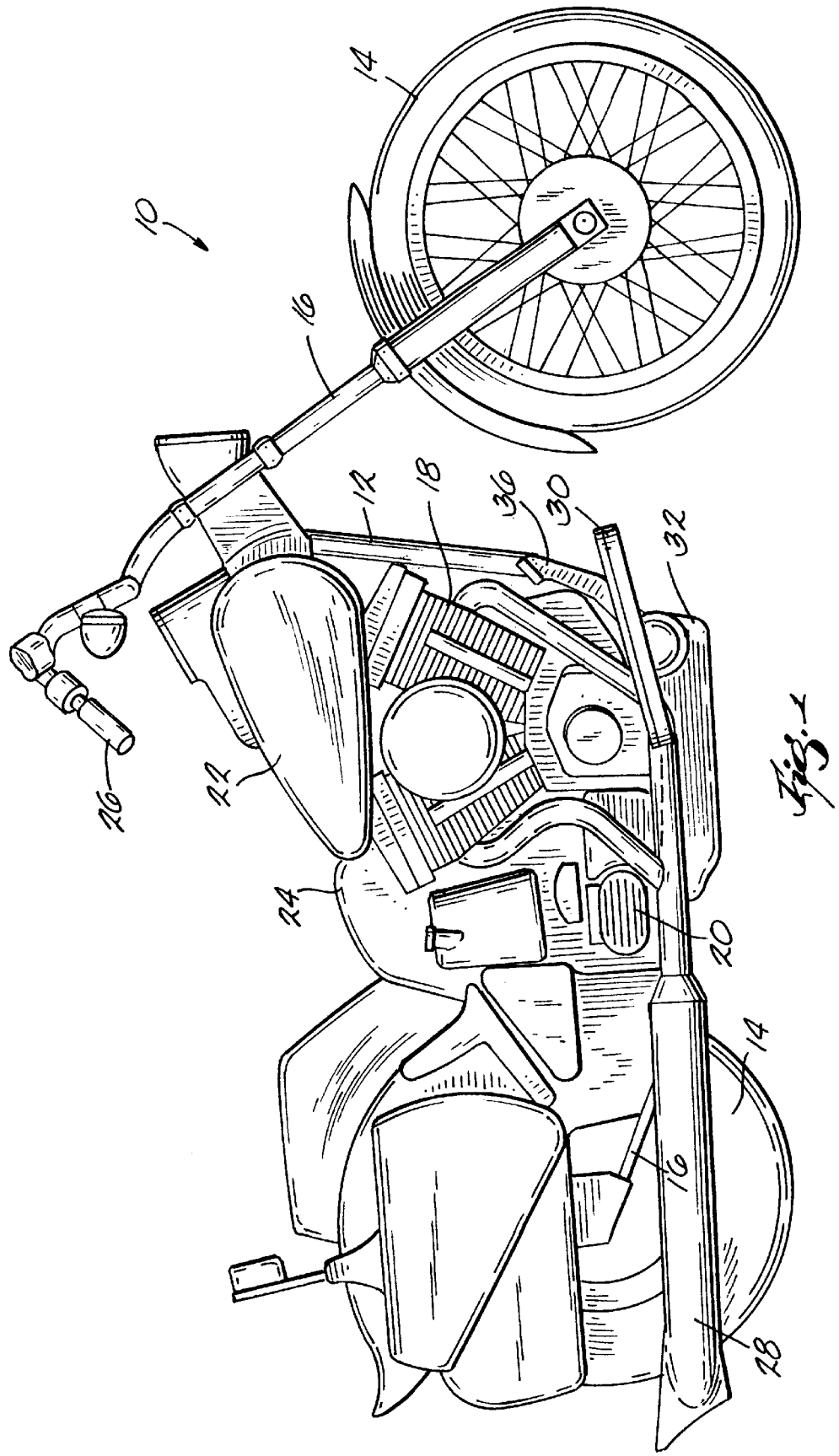

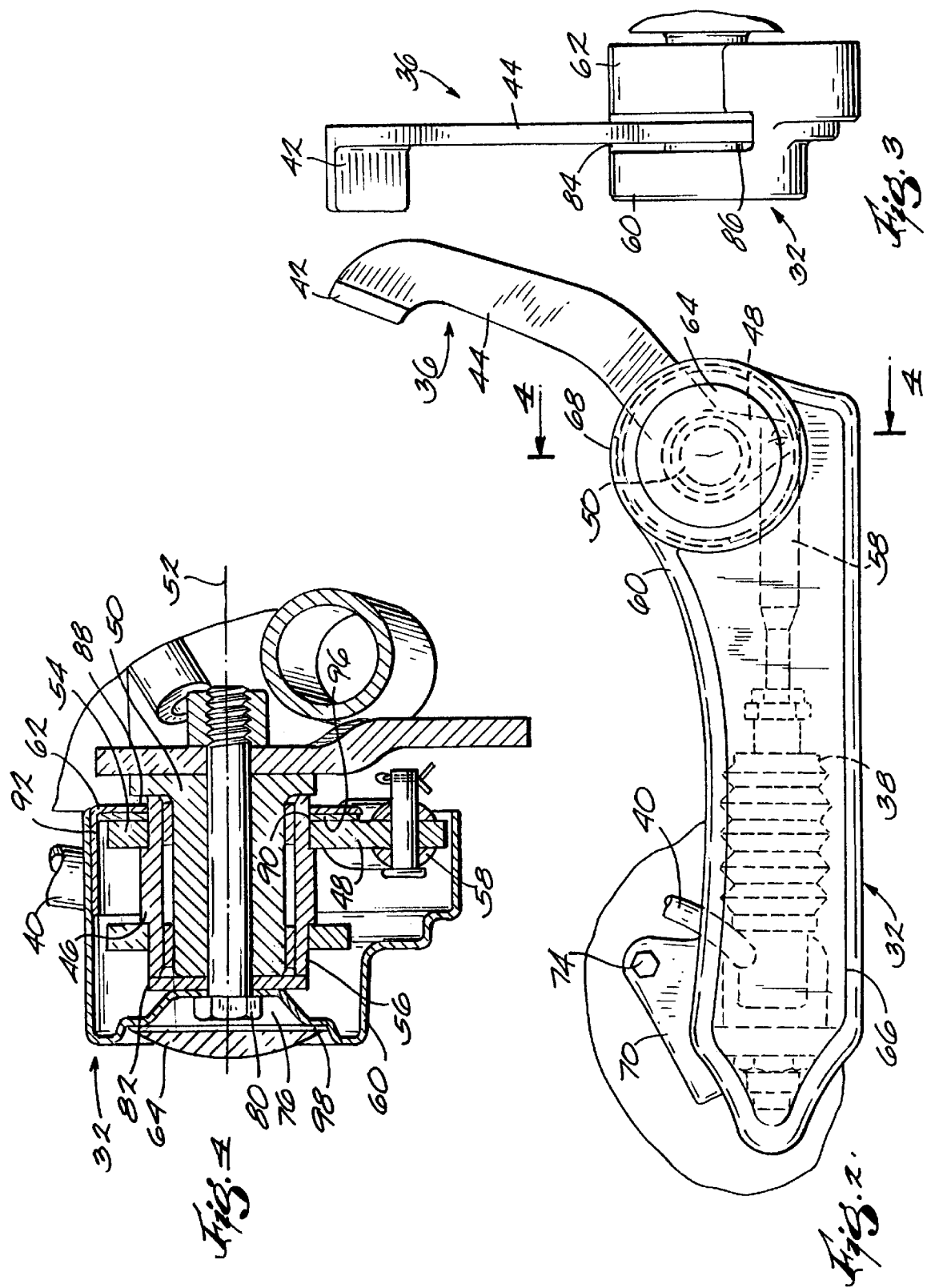

6,073,718

MOTORCYCLE MASTER CYLINDER COVER

FIELD OF THE INVENTION

The invention relates to master cylinder covers for motorcycles.

BACKGROUND

It is desirable to provide a protective covering for the rear master cylinder assembly and a portion of the brake pedal of a motorcycle. Such a protective covering also conceals the aesthetically displeasing master cylinder assembly and a portion of the brake pedal.

Prior art covers for master cylinders and brake pedals are either difficult to install or are aesthetically displeasing. Prior art covers include several small fasteners that may be difficult to handle and install. The various components of prior art covers do not fit together to provide a smooth single-piece appearance, but rather provide broken lines and surfaces. Also, prior art covers include exposed fasteners that detract from the aesthetic appearance of the cover.

SUMMARY

The invention provides a cover for the rear master cylinder assembly and a portion of the brake pedal of a motorcycle. The cover includes first and second cover members. The first cover member covers the outer end of the brake pedal hub, and conceals the master cylinder assembly. The first cover member is fixed with respect to the motorcycle frame, and the brake pedal hub is free to rotate with respect to the first cover member. The second cover member fits over the inner end of the brake pedal hub, and is fixed for rotation with the brake pedal hub. A slot is defined between the first cover member and the second cover member through which the brake pedal lever extends, thereby allowing full range of motion of the brake pedal lever within in the slot.

In one aspect of the invention, the second cover member and first cover member are in telescoping relationship with each other. Preferably, the second cover member is at least partially disposed within the first cover member. Preferably, the first cover member includes a first cut-out to accommodate the brake pedal lever, and the second cover member includes a second cut-out to accommodate an actuating portion of the brake pedal hub.

Additional aspects and advantages of the invention are described below.

BRIEF DESCRIPTION OF THE DRAWINGS

FIG. 1 is a right side view of a motorcycle including a master cylinder cover according to the present invention.

FIG. 2 is an enlarged side view of the master cylinder cover of FIG. 1.

FIG. 3 is a front view of the master cylinder cover of FIG. 1.

FIG. 4 is a section view taken along line 4—4 in FIG. 2.

DETAILED DESCRIPTION

Figure 5:
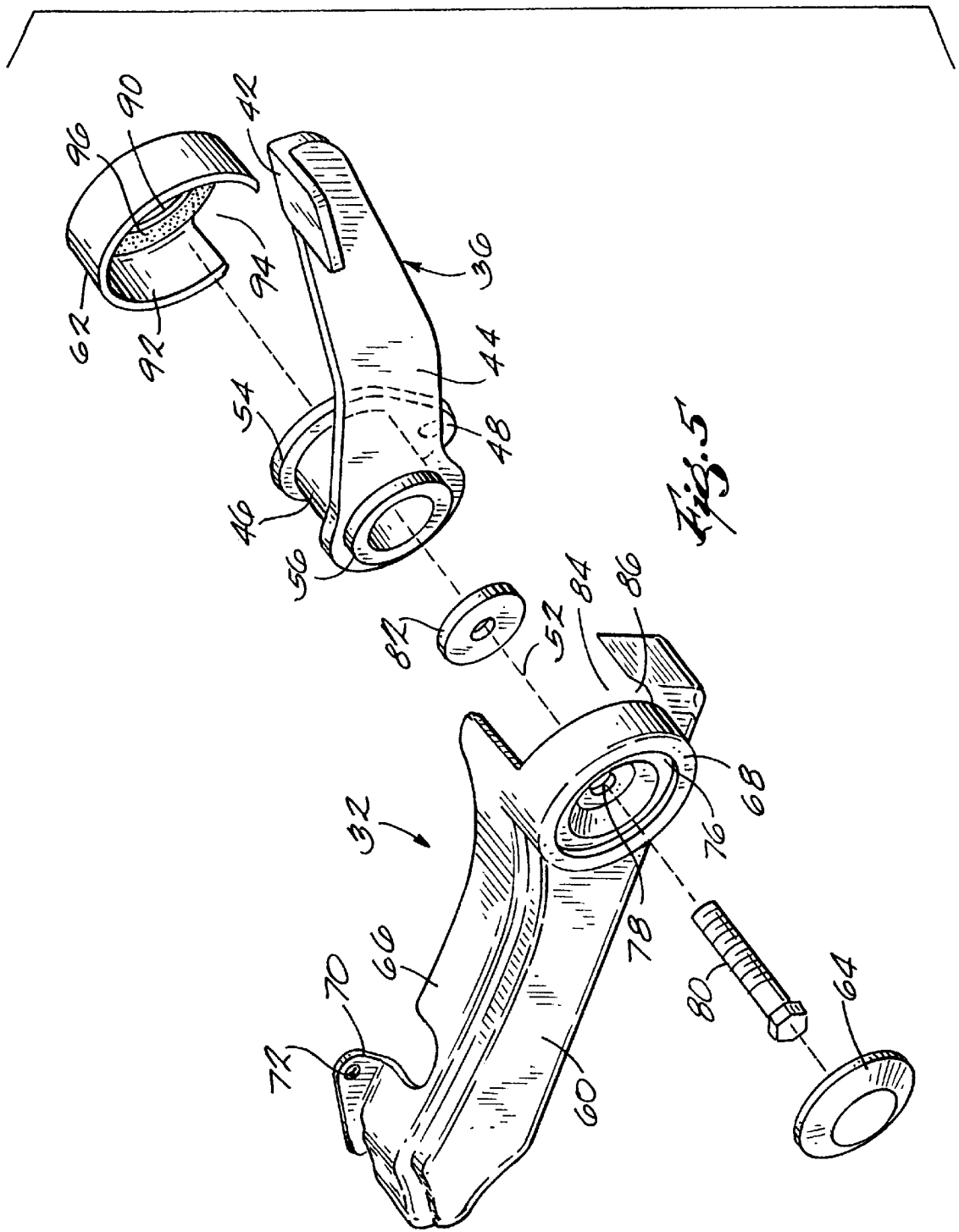
FIG. 5 is an exploded view of the master cylinder cover and the motorcycle brake pedal.

FIG. 1 illustrates a motorcycle 10 including a frame 12 supported on front and rear wheels 14 by front and rear suspensions 16. The motorcycle 10 also includes an engine 18 and a transmission 20 supported by the frame 12, a gas tank 22, a seat 24, handlebars 26, exhaust pipes 28, a foot board 30, and a master cylinder cover 32.

FIG. 2 better illustrates the master cylinder cover 32 and a rear brake system of the motorcycle 10. The rear brake system includes a brake pedal 36, a master cylinder assembly 38, a hydraulic hose 40 extending from the master cylinder assembly 38, and calipers (not shown) mounted near a disc (not shown) on the rear wheel 14. The illustrated master cylinder cover 32 at least partially covers the master cylinder assembly 38 and a portion of the brake pedal 36.

Still referring to FIG. 2, the brake pedal 36 includes a foot pad 42, a lever 44 extending down from the foot pad 42, and a brake hub 46 (FIGS. 4 and 5). The brake hub 46 is generally cylindrical, and includes an actuating portion 48 extending away from the brake hub 46. The brake hub 46 is mounted on a brake axle 50 (FIG. 4) for rotation about an axis of rotation 52 passing through the brake hub 46. The brake hub 46 rotates about the brake axle 50 in response to force exerted on the foot pad 42. For convenience, the end of the illustrated brake hub 46 closer to the motorcycle 10 when the brake pedal 36 is properly installed is hereinafter referred to as the "inner end" 54, and the opposite end is referred to as the "outer end" 56.

A brake rod 58 or clevis is coupled to the actuating portion 48 and extends to the master cylinder assembly 38. As the brake hub 46 is rotated in the clockwise direction as seen in FIG. 2, the brake rod 58 is forced toward the master cylinder, causing an increase in pressure in the master cylinder and subsequent activation of the calipers on the rear disc.

FIG. 5 illustrates the master cylinder cover 32 in more detail. The master cylinder cover 32 includes a first cover member 60, a second cover member 62, and a cap 64.

The first cover member 60 includes an elongated portion 66 and a substantially cylindrical portion 68. The elongated portion 66 includes a flange 70 having an aperture 72 therethrough. A fastener, such as a bolt 74 (FIG. 2), may be passed through the aperture 72 and threaded into a threaded aperture (not shown) in the motorcycle 10. As seen in FIG. 2, the elongated portion 66 substantially covers the master cylinder assembly 38.

The substantially cylindrical portion 68 of the first cover member 60 is raised with respect to the elongated portion 66, and covers the outer end 56 of the brake hub 46. One end of the substantially cylindrical portion 68 includes a recess 76 having an aperture 78 therethrough. A fastener, such as a bolt 80, may be passed through the aperture 78 and the brake axle 50, and threaded into the motorcycle 10. A washer 82 is disposed between the first cover member 60 and the outer end 56 of the brake hub 46 to facilitate rotation of the brake hub 46 with respect to the first cover member 60. This bolt 80, along with the bolt 74 mentioned above, secures the first cover member 60 to the motorcycle 10 such that the first cover member 60 does not rotate with respect to the motorcycle 10, and such that the brake hub 46 is free to rotate with respect to the first cover member 60.

Referring to FIGS. 3 and 5, the opposite end of the cylindrical portion 68 defines a first cut-out 84 which includes a notch 86. The cylindrical portion 68 is sized to fit over the outer end 56 of the brake hub 46 (including the actuating portion 48) with the lever 44 received in the first cut-out 84.

The illustrated second cover member 62, shown in FIG. 5, is substantially cylindrical in shape, and includes an end wall 88 defining an aperture 90 (FIG. 4), and a skirt 92 defining a second cut-out 94. The illustrated aperture 90 in the end wall 88 is substantially circular, and is sized to permit the brake axle 50 to extend through the end wall 88. The second cover member 62 is sized to fit over the inner end 54 of the brake hub 46 with the actuating portion 48 extending through the second cut-out 94. The second cover member 62 is also sized to fit at least partially within the cylindrical portion 68 of the first cover member 60 in a telescoping relationship (FIG. 4). A layer of adhesive is provided on the inner surface of the end wall 88 to fix the second cover member 62 to the inner end 54 of the brake hub 46 for rotation therewith. In the illustrated embodiment, the layer of adhesive comprises an adhesive foam tape 96.

The cap 64 is sized to fit over the recess 76 in the cylindrical portion 68 of the first cover member 60 to conceal the head of the bolt 80. The illustrated cap 64 includes a layer of adhesive (e.g., adhesive foam tape 98) to secure the cap 64 over the recess 76. Alternatively, the cap 64 may be mounted over the recess 76 by other means, such as a snap-fit, a threaded engagement, a hinge, welding, or with fasteners.

The master cylinder cover 32 is installed on the motorcycle 10 as follows. The brake pedal 36 is removed from the brake axle 50 by removing the bolt 80 and the washer 82, detaching the brake rod 58 from the actuating portion 48, and sliding the brake pedal 36 off the brake axle 50. Then the second cover member 62 is slid over the inner end 54 of the brake hub 46 with the actuating portion 48 extending through the second cut-out 94. The adhesive layer forms a bond between the second cover member 62 and the brake hub 46 such that the second cover member 62 is fixed for rotation with the brake hub 46. The brake pedal 36 and second cover member 62 are then slid over the brake axle 50 with the brake axle 50 extending through the aperture 90 in the end wall 88 of the second cover member 62 and through the brake hub 46. The master cylinder assembly 38 is then attached to the actuating portion 48 through the brake rod 58.

Next the bolt 80 is extended through the aperture 78 in the first cover member 60, and the washer 82 is placed over the end of the bolt 80. The bolt 80 is used to locate the first cover member 60 with respect to the brake hub 46, and the first cover member 60 is positioned over the outer end 56 of the brake hub 46 and over the master cylinder assembly 38 as illustrated in FIG. 2. The bolt 80 is extended through the brake hub 46 and brake axle 50, and then threaded into motorcycle 10, and the other bolt 74 is inserted through the other aperture 72 and threaded into the motorcycle 10. The cap 64 is then attached over the recess 76 to cover the bolt 80.

As illustrated in FIG. 3, the second cover member 62 fits within the walls of the first cover member 60, and a slot is defined between the first and second cover members 60, 62. The notch 86 in the first cover member 60 forms the lower portion of the slot. The illustrated slot is arcuate and extends for at least about 90°. The lever 44 of the brake pedal 36 extends through the slot. The master cylinder cover 32 thus substantially encloses the brake hub 46 between the first and second cover members 60, 62, and the brake lever 44 is free to move within the slot formed between the first and second cover members 60, 62. The slot, including the notch 86, allows the full operable range of motion for the brake lever 44. The second cover member 62 substantially closes the portion of the first cut-out 84 over the inner end 54 of the brake hub 46 to provide a one-piece appearance.

Although particular embodiments of the present invention have been shown and described, other alternative embodiments will be apparent to those skilled in the art and are within the intended scope of the present invention. Thus, the present invention is to be limited only by the following claims.

What is claimed is:

1. A master cylinder cover for use with a motorcycle having a brake lever, a brake hub, and a master cylinder, said master cylinder cover comprising:

a first cover member adapted to at least partially cover the master cylinder and a first end of the brake hub;

a second cover member, separable from said first cover member, and adapted to at least partially cover a second end of the brake hub.

2. The master cylinder cover of claim 1, wherein said first cover member is adapted to allow the brake hub to rotate with respect to said first cover member.

3. The master cylinder cover of claim 1, wherein said first cover member includes a recessed portion defining an aperture, said master cylinder cover further comprising:

a fastener extending through said aperture and adapted to fasten said first cover member to the motorcycle such that the brake hub rotates with respect to said first cover member; and a cap substantially covering said recessed portion.

4. The master cylinder cover of claim 1, wherein said first and second cover members define a slot therebetween, said slot adapted to allow the brake lever to extend therethrough.

5. The master cylinder cover of claim 1, wherein said first and second cover members are in telescoping relationship with each other.

6. The master cylinder cover of claim 5, wherein said second cover member at least partially extends into said first cover member.

7. The master cylinder cover of claim 1, wherein said second cover member is adapted to be fixed to the brake hub for rotation with the brake hub.

8. The master cylinder cover of claim 7, wherein said second cover member includes a layer of adhesive adapted to fix said second cover member to the brake hub for rotation therewith.

9. The master cylinder cover of claim 1, wherein said second cover member includes a cut-out adapted to receive an actuating portion of the brake hub.

10. A motorcycle comprising:

a frame;

a brake hub rotatably mounted on said frame;

a brake lever attached to said brake hub;

a master cylinder connected to said brake hub;

a first cover member at least partially covering said master cylinder and a first end of said brake hub;

a second cover member, separable from said first cover member, and at least partially covering a second end of said brake hub.

11. The motorcycle of claim 10, wherein said brake hub is rotatable with respect to said first cover member.

12. The motorcycle of claim 10, wherein said first cover member includes a recessed portion defining an aperture, said motorcycle further comprising:

a fastener extending through said aperture to fasten said first cover member to said frame such that said brake hub is rotatable with respect to said first cover member; and a cap substantially covering said recessed portion.

13. The motorcycle of claim 10, wherein said first and second cover members define a slot therebetween, wherein said lever extends through said slot.

14. The motorcycle of claim 10, wherein said first and second cover members are in telescoping relationship with each other.

15. The motorcycle of claim 14, wherein said second cover member at least partially extends into said first cover member.

16. The motorcycle of claim 10, wherein said second cover member is fixed to said brake hub for rotation with said brake hub.

17. The motorcycle of claim 16, wherein said second cover member includes a layer of adhesive for fixing said second cover member to said brake hub for rotation therewith.

18. The motorcycle of claim 10, wherein said second cover member includes a cut-out adapted to receive an attaching portion of said brake hub.

19. A method of mounting a master cylinder cover to a motorcycle having a master cylinder and a brake lever, comprising the steps of:

positioning a first cover member over at least a portion of the master cylinder and over an outer end of the brake lever;

attaching the first cover member to the motorcycle;

positioning a second cover member over an inner end of the brake lever; and attaching the second cover to the motorcycle.

20. The method of claim 19, wherein said step of attaching the second cover includes securing the second cover to the brake lever.

* * * * *

UNITED STATES PATENT AND TRADEMARK OFFICE
CERTIFICATE OF CORRECTION

PATENT NO. : 6,073,718
DATED : June 13, 2000
INVENTOR(S) : Timothy et al

It is certified that error appears in the above-identified patent and that said Letters Patent is hereby corrected as shown below:

<u>ON THE TITLE PAGE</u>

Item [56] References Cited, add the following:

```
--OTHER PUBLICATIONS

1994 Custom Chrome Catalog, pages 469 and 475
1997 J & P Cycles Catalog, pages 10-13, 10-14, and 10-15
1997 Custom Chrome Instructions
1997 Custom Chrome Master Cylinder/Brake Pivot Cover packaging insert--
```

Signed and Sealed this

Eighth Day of May, 2001

*Attest:*

NICHOLAS P. GODICI

*Attesting Officer*     Acting Director of the United States Patent and Trademark Office